United States Patent [19]
Baumann et al.

[11] Patent Number: 5,473,798
[45] Date of Patent: Dec. 12, 1995

[54] HOSE CLIP

[75] Inventors: Artur Baumann, Aixheim; Manfred Geiger, Roettenbach, both of Germany

[73] Assignee: PEBRA GmbH Paul Braun, Esslingen, Germany

[21] Appl. No.: 150,149

[22] PCT Filed: Apr. 7, 1992

[86] PCT No.: PCT/EP92/00788

§ 371 Date: Apr. 1, 1994

§ 102(e) Date: Apr. 1, 1994

[87] PCT Pub. No.: WO92/20950

PCT Pub. Date: Nov. 26, 1992

[30] Foreign Application Priority Data

May 24, 1991 [DE] Germany .................. 41 16 918.2

[51] Int. Cl.$^6$ .................................................. B65D 63/00
[52] U.S. Cl. ........................................... 24/274 R; 24/279
[58] Field of Search .......................... 24/274 R, 279, 24/275, 20 R, 485

[56] References Cited

U.S. PATENT DOCUMENTS

| | | |
|---|---|---|
| 2,346,906 | 4/1944 | Cheney . |
| 2,477,045 | 7/1949 | Cheney . |
| 3,840,018 | 10/1974 | Heifetz ............................ 24/274 R |
| 3,914,832 | 10/1975 | Petrus ............................. 24/274 R |
| 3,924,308 | 12/1975 | Duprez ............................ 24/274 R |
| 4,099,304 | 7/1978 | Luc ................................. 24/274 R |

FOREIGN PATENT DOCUMENTS

| | | |
|---|---|---|
| 1215738 | 4/1960 | France . |
| 2136677 | 7/1971 | Germany ........................ 24/274 R |
| 2053159 | 11/1979 | Germany ........................ 24/274 R |
| 0566271 | 12/1944 | United Kingdom . |
| 0567031 | 1/1946 | United Kingdom . |
| 0586235 | 3/1947 | United Kingdom . |
| 0706207 | 3/1954 | United Kingdom . |
| 1313649 | 4/1973 | United Kingdom . |

OTHER PUBLICATIONS

Mills K. Welding, Brazing, Soldering, Metal Handbook, vol. 6, Edition 9; 1983.

*Primary Examiner*—Victor N. Sakran
*Attorney, Agent, or Firm*—Flynn, Thiel, Boutell & Tanis

[57] ABSTRACT

The invention relates to a hose clip with a bearing part for a band tightening screw, a metal housing with a bracket and an annularly curved flat metal band. At one end the metal band is rigidly secured to the bracket and its other free end can be led through a band channel in the housing close to the bracket. In addition, in the region of its free end, the metal band has a grid-like set of perforations with transversely inclined shoulders to engage with a short thread on the tightening screw in the bracket region of the housing. To permit automatic manufacture with a high degree of process reliability, the housing takes the form of a one-piece bent component attached by laser weld seams at joining points in the region of the bearing part and the saddle. In addition, one end of the band is either butt or lap-welded to the bracket by another laser weld seam. The band tightening screw is arranged axially and radially in the bearing part with a head section and, at the end opposite the head section has a short thread. The short thread can be fully axially moved out of its region of engagement with the band perforation, thus permitting rapid fitting.

13 Claims, 9 Drawing Sheets

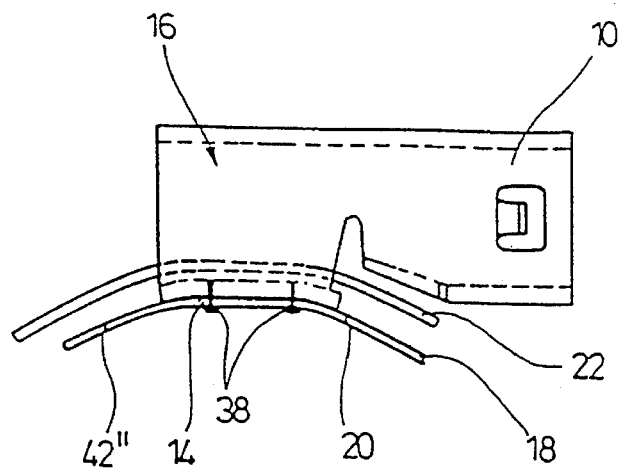
Fig. 3
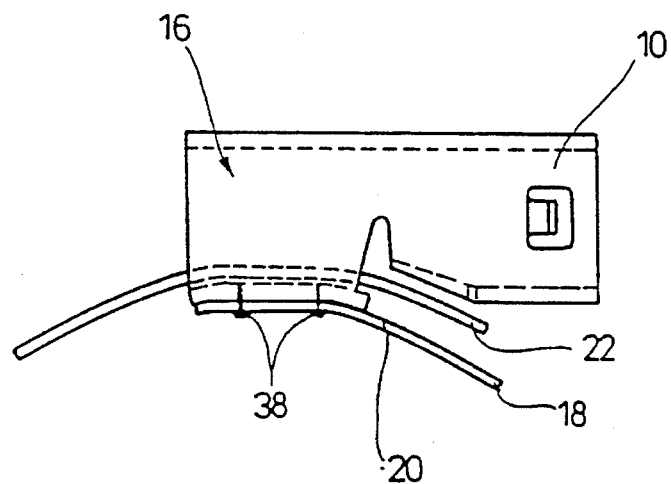
Fig. 4
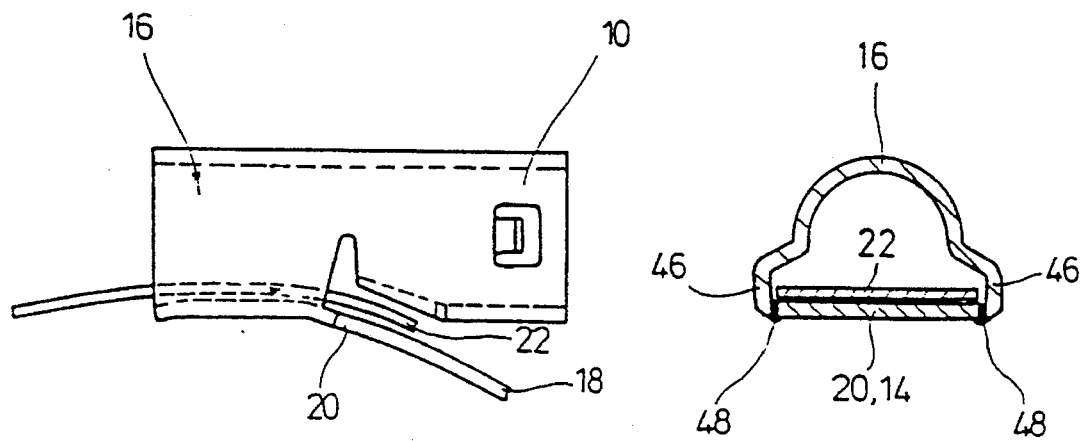
Fig. 5a
Fig. 5b

Fig. 9
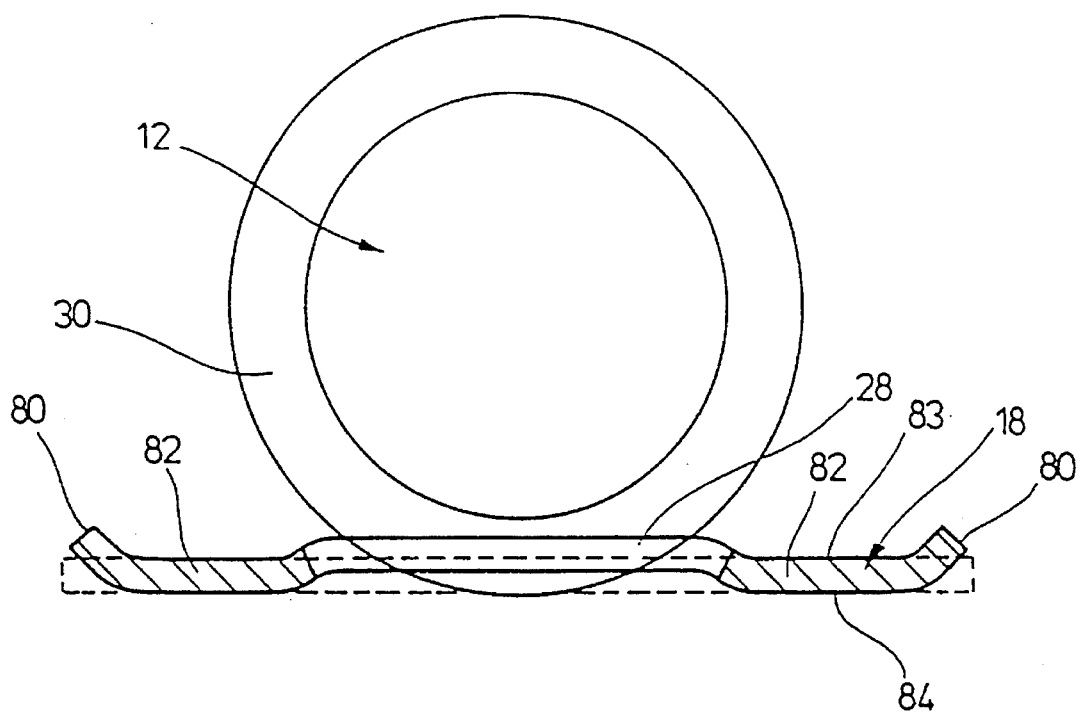
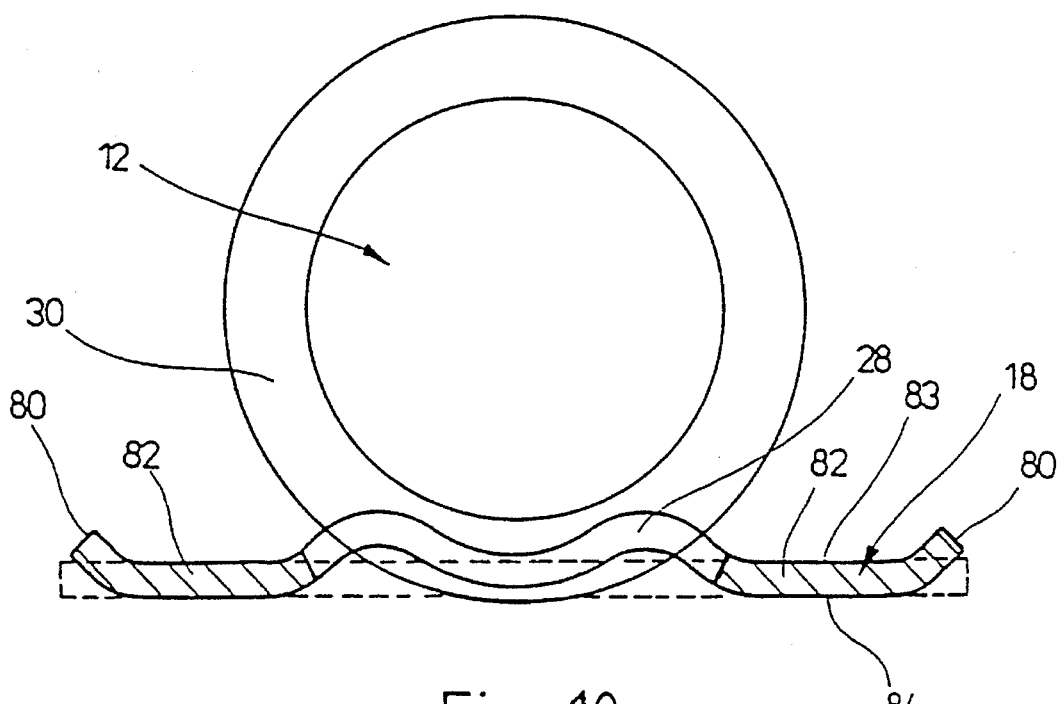
Fig. 10

HOSE CLIP

DESCRIPTION

The invention relates to a hose clip comprising a metallic housing, which has a bearing part for supporting a band-tightening screw and a saddle, and an annularly curved flat metal band, which near its one end is rigidly connected to the saddle and can be guided with its other, free end through a band channel of the housing, and which has a grid-like sequence of perforations or slots with transversely inclined shoulders for engagement by a thread of the band-tightening screw, which thread is arranged in the saddle area of the housing.

In common hose clips, where the saddle and the housing are connected in one piece with one another, joints are mostly secured by bent tabs, while the band in the band channel is positively connected to the housing. The known hose clips have mainly disadvantages in the finishing technique, since the saddle mounting on the band, the introduction of the screw, the mounting of the housing and the closing of the housing are relatively complicated and not fully automated operations. To improve the finishing technique, resistance welding (spot welding) has already been utilized for connecting the housing to the band, which, however, permits only overlapping welds. Furthermore, resistance welding is not satisfactory with respect to process safety since nondestructive testing during the welding operation is not possible, and the weld seams can therefore only be tested by random sampling. A further disadvantage of this connecting technique is seen in bulges or recesses being formed in the area of the weld seams, which bulges or recesses cave-in during fastening of the hose clips to the hose material, and can thereby result in breakdowns in operation, in particular in an early wear.

Starting out from the above, the basic purpose of the invention is to develop a novel hose clip, which can be manufactured easily and automatically and at the same time meet the high demands regarding process safety and operational reliability.

To attain this purpose, the invention suggests that the housing is designed as a one-piece bent stamped part, which is joined at joints in the area of the bearing part and/or the saddle by means of at least one line-like or spot-like laser welding seam and/or is connected to one band end. Extensive tests have shown that bulge-free, recess-free and shoulder-free welds are possible with the laser welding technique also in the area of joints, a basic condition for use in hose clips. Only with this is it possible to weld bulge-free and recess-free from the easily accessible inside of the band (thus from the side, which later rests against the hose surface). Through the possibility of a break-down-free on-line monitoring of the laser welding seam, a high degree of process safety during automatic manufacturing is achieved. The welding operations, which are relatively easy to carry out, finally make it possible to manufacture the housing, in spite of its complicated outer design, as a one-piece bent part or a bent stamped part (instead of the otherwise common deep-drawing parts), with accordingly lower manufacturing and tool input and shorter cycle times.

A preferred embodiment of the invention provides that the saddle and/or the bearing part have bent plates, which are arranged in pairs mirror-inverted with respect to one another and are bent toward one another forming a joint, preferably aligned in the longitudinal direction of the band, which plates are connected to one another in pairs at their joints by laser weld seams. The adjacent bent plates of the saddle and of the bearing part are thereby advantageously separated from one another by a transverse notch forming a band outlet of the band channel.

According to a preferred embodiment of the invention, the one band end is butt-welded with its free front edge to the saddle edge on the side adjacent the bearing part, preferably from the inside of the band by means of a laser welding seam. To better support the band end introduced into the band channel, a freely projecting tongue, preferably curved in the direction of the band, can in this case be arranged on the opposite saddle edge, which tongue in turn can be welded or joined in an extension of the saddle seam.

A further advantageous possibility for mounting the one band end on the saddle is that the respective band end is welded to an outer wide portion of the saddle by means of an overlapping laser welding seam, preferably welded from the inside (84) of the band. The one band end can, as an alternative, be welded preferably from the inside of the band in the area of a bent part on an inner wide portion of the saddle by means of an overlapping laser welding seam. A further manufacturing modification is that the saddle, which is formed on and integrated on the housing is eliminated, and instead the one band end, while forming the saddle, is welded preferably from the inside of the band at its side edges by means of two laser welding seams in the edge area of two oppositely lying housing plates.

The welded-on band end can, in the three last-mentioned solutions, project with its free end over the saddle toward the side opposite the bearing part and thus cover the perforations or slots of the other band end toward the inside of the band (toward the hose).

In order to produce a sufficiently wide band opening or outlet for the exit of the free band end from the band channel, it is advantageous when the laser welding seams of the bearing part and of the saddle are offset step-like with respect to one another leaving the band outlet free. To improve the guiding of the band, the saddle can have on the side of the bearing part a plate-like extension which is curved preferably in the direction of the band.

The handling of the hose clip is made easier by a snap closure, which can be operated both during the introduction into, and also during the pulling out of, the free band end from the band channel and which, according to the invention, consists in the band-tightening screw being supported with a head portion axially and radially on the bearing part and carrying a short thread at its end opposite the head portion, which short thread can be completely axially moved from its engagement area with the band perforation or slot by axially moving the band-tightening screw. The head portion of the band-tightening screw is thereby pressed with an axial shoulder against an outer edge of the bearing part forming the axial bearing under the influence of an elastic initial tension (as with a loose band), or the initial tension of the band coupled with the short thread, which initial tension is produced during clamping of the hose clip on a hose. It is particularly advantageous, when in the area of the bearing part, at least one stop, preferably designed as a bent tab and serving at the same time as a safety lock, is arranged near an annular shoulder on the side of the head for axially limiting the short thread. In order to be able to lift the short thread easier out of the perforation during the uncoupling operation, the band-tightening screw has a shank part with a reduced diameter between the head portion and the short thread, which shank part is preferably many times longer than the short thread.

According to a further preferred embodiment of the invention, the short thread is radially supported in the saddle area of the housing, while the saddle can have a partially cylindrical recess to receive the short thread extending through the band perforations.

To further improve the depth of engagement of the thread of the band-tightening screw, the invention suggests that the metal band in the area of the transverse shoulders defining the perforations is arched or curved radially outwardly from an outer surface of the band (and thus toward the inside of the housing) with respect to the edge strips adjacent the side edges. This measure achieves at the same time that the metal band rests mainly with the edge strips against the surface of the hose so that an undesired form-locking indenting of the hose material into the perforations of the metal band is avoided. The transverse shoulders are thereby advantageously convexly arched radially outwardly from the band. They can, however, also be curved trapezoidally or wave-like, with the latter case having the advantage that threads engaging the perforations are supported with otherwise the same dimensions over a larger circumferential section on the transverse shoulders.

The invention will be discussed in greater detail hereinafter in connection with some exemplary embodiments schematically illustrated in the drawings, in which:

FIGS. 1a to c are a side view, a front view and a bottom view respectively, of a hose clip with a butt-welded metal band;

FIGS. 2a and b are a side view and a front view respectively, of a hose clip with overlapping welding on the inner band;

FIG. 3 is a side view of a hose clip with overlapping welding on the outer band and projecting covering tongue;

FIG. 4 is a side view of a hose clip with overlapping welding on the outer band without tongue;

Figure 7:
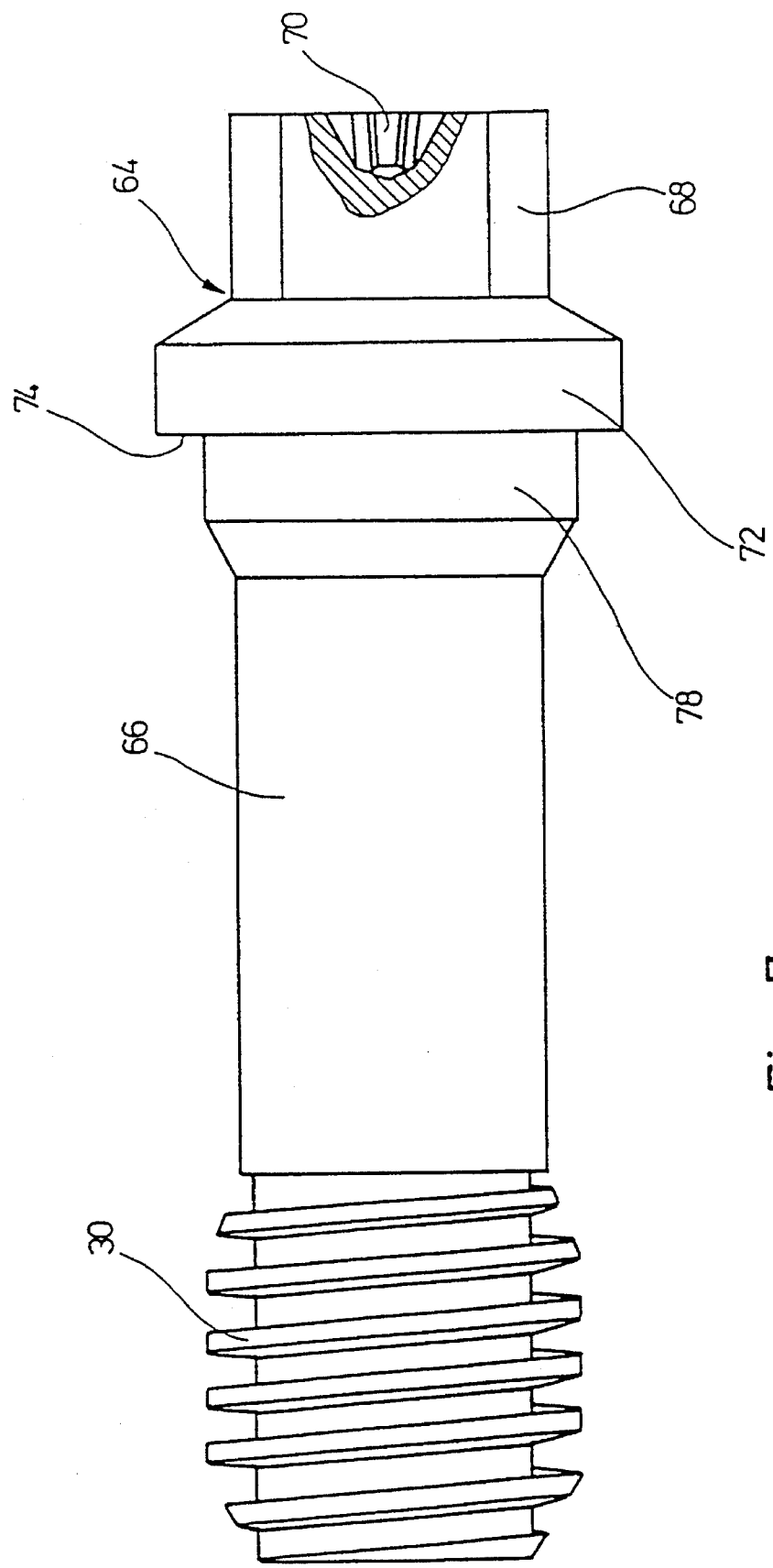
Figure 8A:
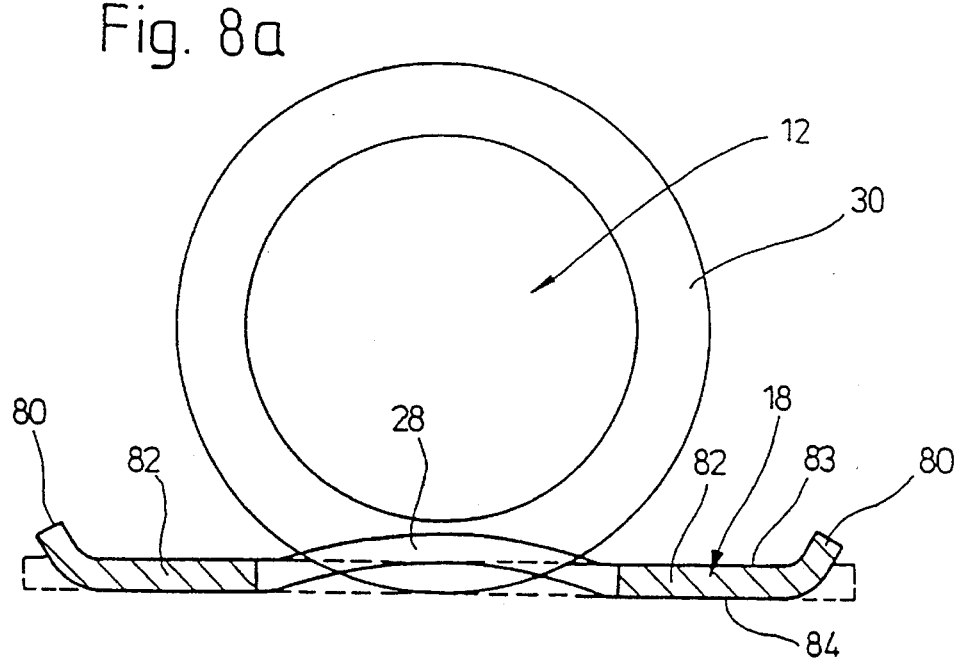

FIGS. 5a and b are a side view and a front view respectively, of a hose clip with welded-in band with a saddle function;

FIGS. 6a to d are a perspective illustration and three cross-sectional illustrations of a hose clip;

FIGS. 7 is a side view of the band-tightening screw of a hose clip;

FIGS. 8a and b are a cross-sectional view and a top view respectively, of a metal band with a convexly shaped perforated area;

FIG. 9 is a cross-sectional view of a metal band with a trapezoidally shaped perforated area;

FIG. 10 is a cross-sectional view of a metal band with a wave-like shaped perforated area.

The hose clips illustrated in the drawings consist essentially of a metallic housing 16 having a bearing part 10 for a band-tightening screw 12 and a saddle 14, and an annularly curved flat metal band 18. The metal band 18 has one end 20 rigidly connected to the saddle 14 and a free end 22 guided through a band channel 24 of the housing 16. The metal band 18 has furthermore near its free end 22, a grid-like sequence of slots or perforations 26 with transversely inclined shoulders 28 for engagement by the thread 30 of the band-tightening screw 12, which thread is arranged in the saddle area of the housing 16. The housing 16 is designed as a bent stamped metal part, which is joined together at joints 32, 34 in the area of the bearing part 10 and of the saddle 14 by means of each one laser weld seam 36 and 38 respectively. The joint welds are advantageously line welds, while the overlapping welds are spot welds (YAG-laser) or system welds (with cross and longitudinal spot seams).

Figure 1A:
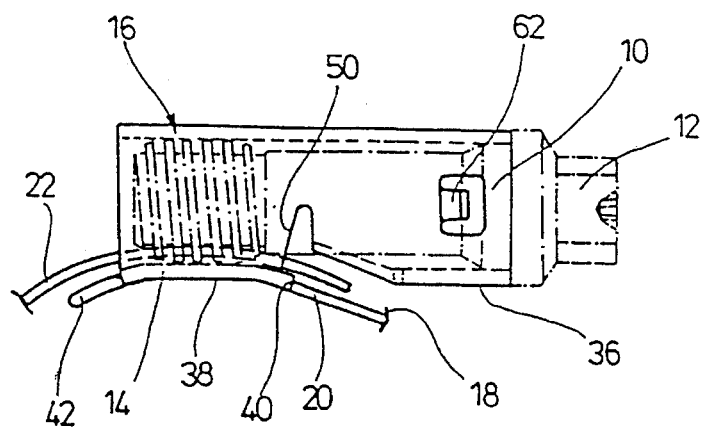
Figure 1B:
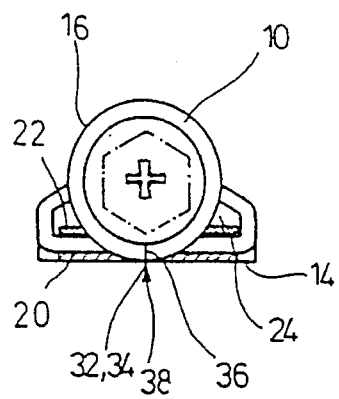
Figure 1C:
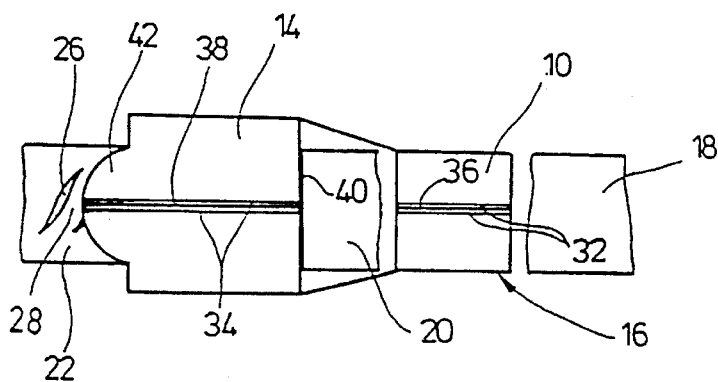

The band end 20 is, in the exemplary embodiment according to FIGS. 1a to 1c, butt-welded with its front edge by means of a transversely extending laser line seam 40 to the edge of the saddle 14 on the side the bearing part. The joint seams 32, 34 are there longitudinally extending laser line seams. A tongue 42 is formed on the edge of the saddle 14, which edge is remote from the bearing part 10. The tongue 42 is bent in the direction of the band (FIG. 1a).

Figure 2A:
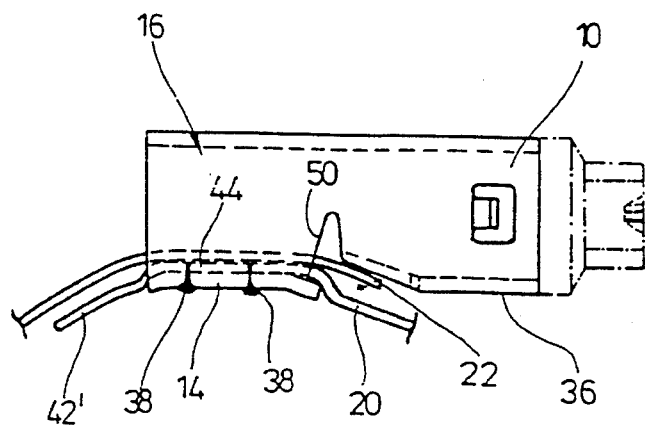
Figure 2B:
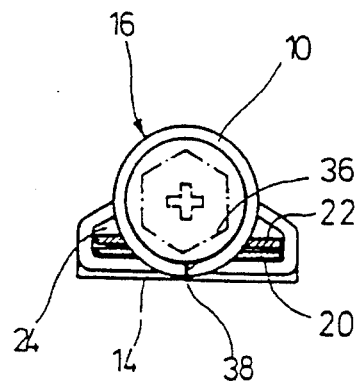

The band end 20 has, in the exemplary embodiment according to FIGS. 2a and b, a crimped portion 44, with which it rests from inside against the saddle 14. The crimped portion 44 is connected in an overlapping manner to the saddle 14 through the saddle 14 or rather its joint 34. The joint 34 of the saddle is thereby joined at the same time. The band end 20 projects from the housing on the side opposite the bearing part 10 and forms a tongue 42', which at least partly overlaps the slots of the other band end 22.

The band end 20 is, in the exemplary embodiments according to FIGS. 3 and 4, welded to the outside of the saddle 14 with an overlapping laser spot weld seam or a system weld seam, either with an extension tongue 42" (FIG. 3) or without such a tongue (FIG. 4).

The band end 20, in the hose clip according to FIGS. 5a and b, is connected with its two side edges to the bottom edges of two oppositely lying bent plates 46 of the housing 16 by means of longitudinally extending laser welding seams 48. The metal band 18 thus takes over the saddle function of the hose clip in this area.

Figure 6A:
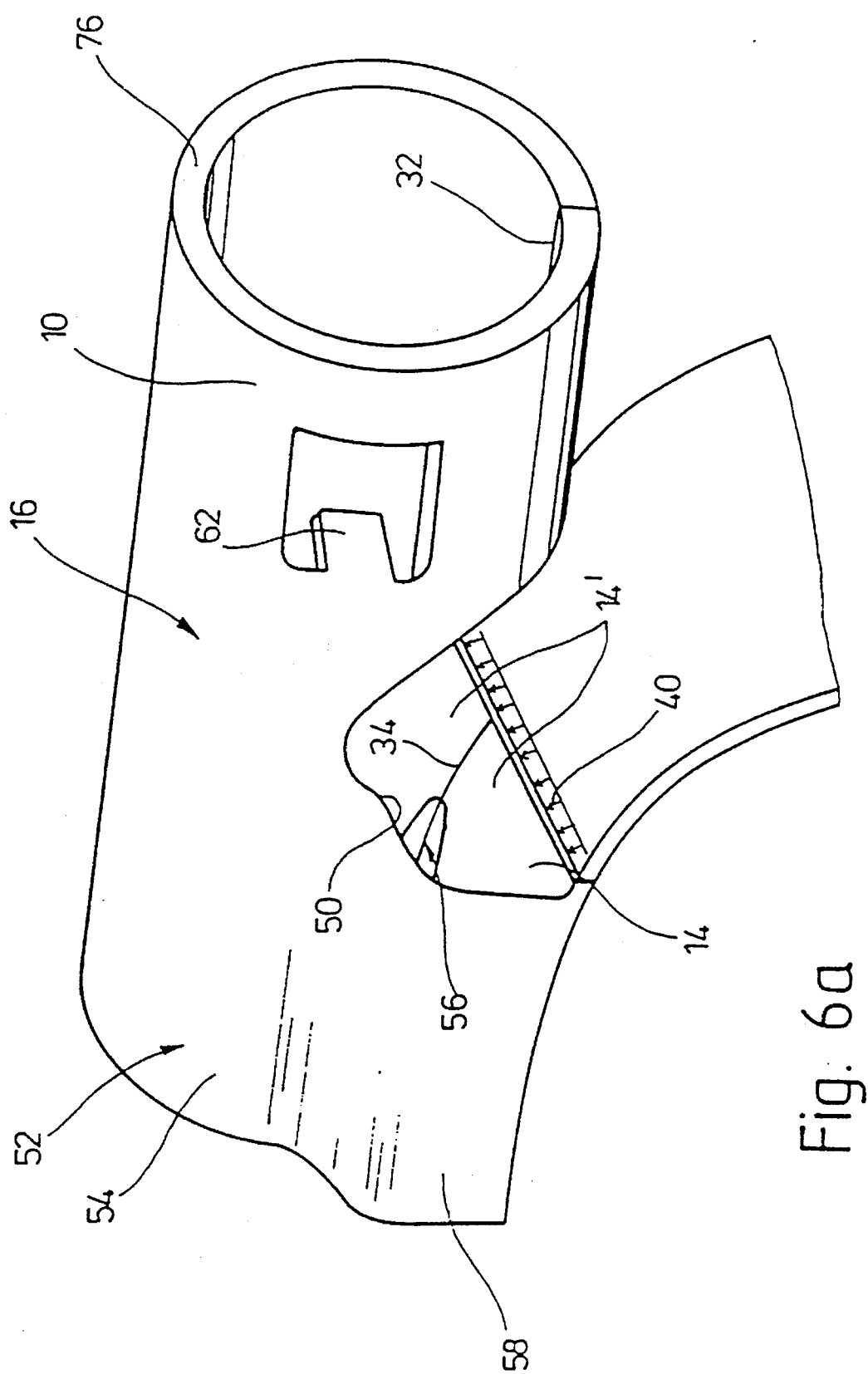
Figure 6B:
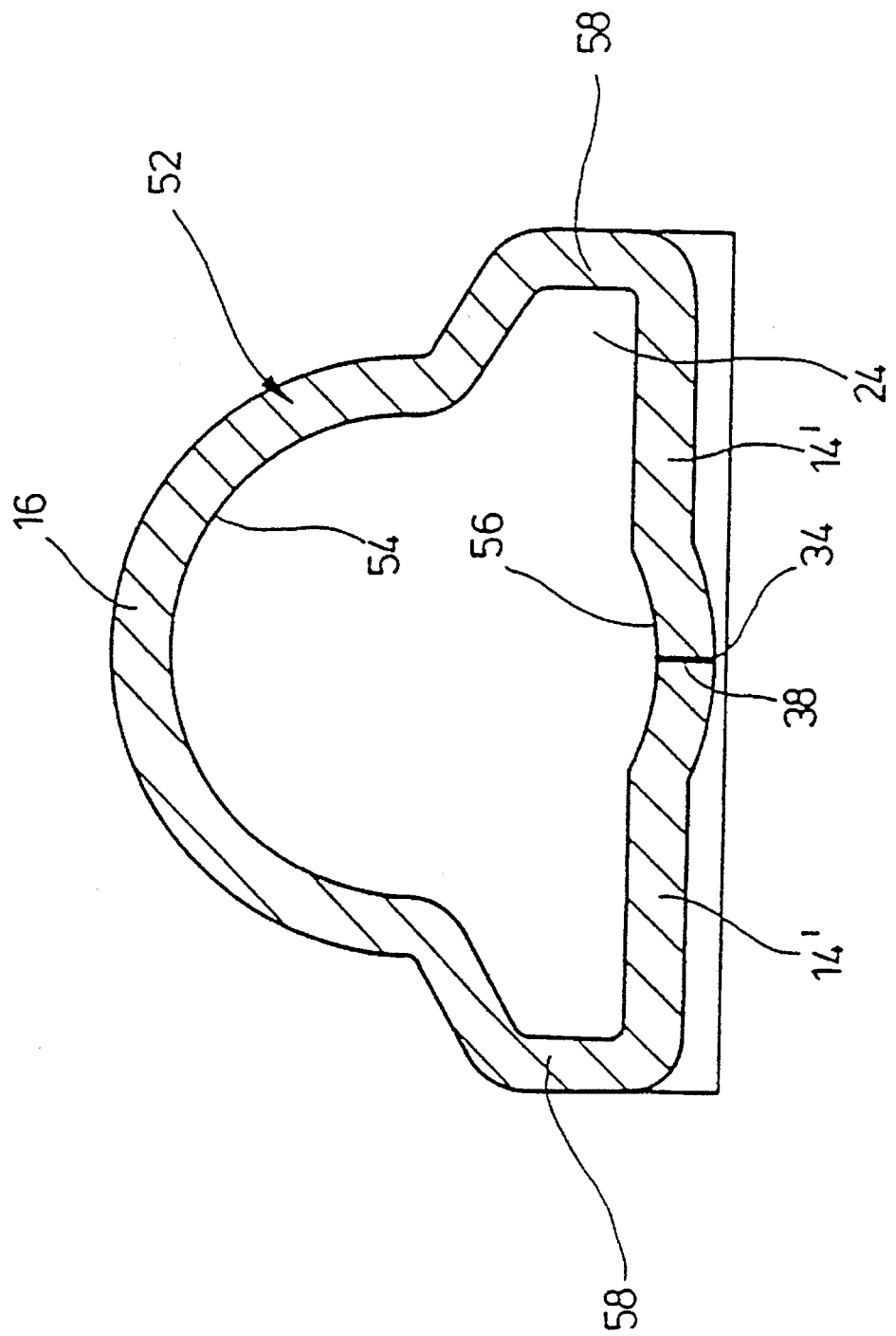
Figure 6C:
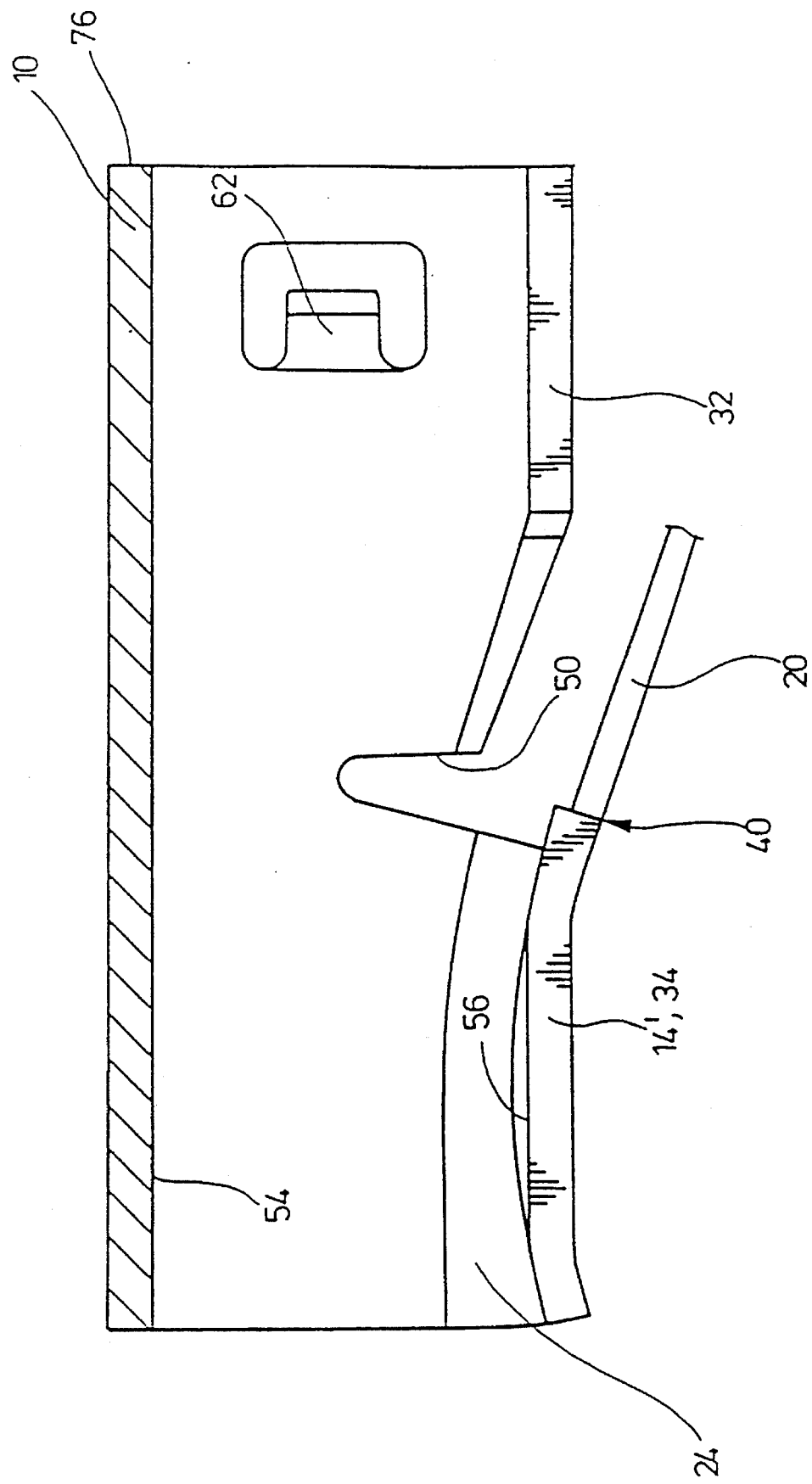
Figure 6D:
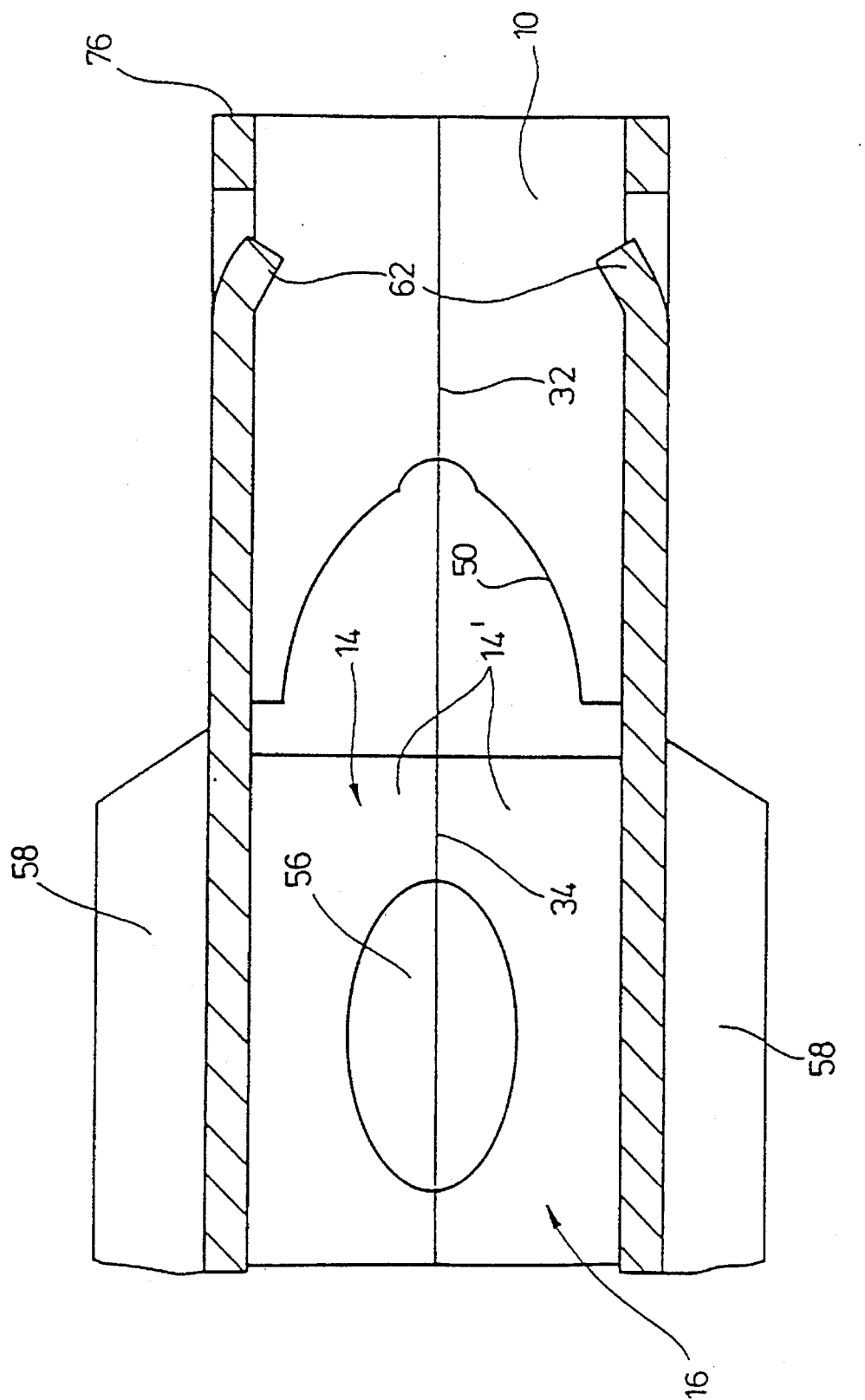

As is shown in FIGS. 6a and d, the housing 16 is constructed as a bent metal part, the blank of which is divided into two portions by a transverse notch 50, namely into the bearing part 10 bent to form a cylindrical tube, and the band guiding and clamping part 52 having the saddle 14. The band guiding and clamping part 52 has in its upper area a semi-cylindrically curved bearing channel 54 for the thread 30 of the band-tightening screw 12, which is supplemented in the abutment area of the saddle 14 by a partially cylindrical recess 56 to form a friction bearing supporting the thread. The widened housing parts 58 following the bearing channel 54 define together with the two inwardly bent saddle plates 14' the band channel 24 for passage by the free band end 22. The saddle plates 14' are welded at the joint 34 by means of a laser weld seam 38, while the bearing point 10 is joined at the joint 32 by a laser welding seam 36. The metal band 18 (like in FIG. 1) is, in the exemplary embodiment illustrated in FIGS. 6a to c, butt-welded to the edge of the saddle 14, which edge is on the side adjacent the bearing part, by means of a transversely extending laser welding seam 40. Two bent tabs 62 arranged on opposite sides can be pressed into the bearing part 10 with the band-tightening screw inserted, with these bent tabs serving as a stop and as a safety lock for the band-tightening screw.

FIG. 7 shows in particular that the band-tightening screw 12 consists of a head portion 64 and a short thread 30 arranged on the opposite end, which are separated from one another by a reduced diameter shank 66. The head portion 64 has a hexagonal pin 68 at its free end, which pin has a cross slot 70 on its front side for a screw driver. The head 72 following the hexagonal pin 68 has a stop shoulder 74, which during operation hits the front edge 76 of the bearing part 10, which front edge 76 serves as an axial bearing. The cylindrical bolt part 78 following the stop shoulder 74 engages, in this state, the cylindrical bearing part 10 and forms together with the same, a radial bearing. The short thread 30 is, in this state, guided in the bearing channel 54 and the recess 56 and engages with its threads, the slots 26 in the free end 22 of the metal band 18 (compare here also FIGS. 8 to 10). By pulling back the band-tightening screw 12 until the short thread 30 hits the bent tabs 62 in the bearing part 10, the passage through the band channel 24 is opened so that the free band end 22 can be freely inserted or pulled out for the purpose of a rapid fitting or installation. The band-tightening screw 12, which is in engagement with the free end 22, is in the mounted state under the influence of the initial elastic tension of the metal band 18 for clamping on a hose, which causes the band-tightening screw 12 to be pulled with its stop shoulder 74 automatically against the front edge 76 of the housing.

Figure 8B:
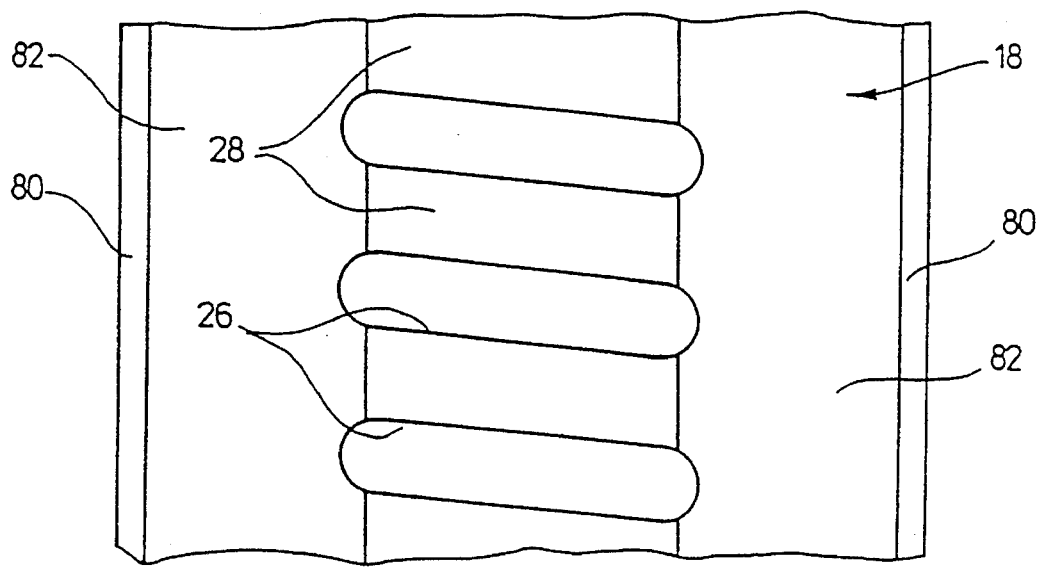

FIGS. 8 to 10 show three variations of the free band end 22 engaging the thread 30 of the band-tightening screw 12. The metal band is, in all three cases, shaped radially outwardly from an outer surface 83 of the band, and thus toward the thread in the area of the transverse shoulders 28 defining the slots 26, with respect to the edge strips 82 adjacent the side edges 80. The curvature of the shoulders 28 is convex in FIG. 8, is trapezoidal in FIG. 9, and is wave-like in FIG. 10. This measure improves, on the one hand, the engagement of the thread 30 with the slots 26. On the other hand, radially the slots 26 and their transverse shoulders 28 do not extend radially inwardly beyond the inner surface 84 of the band in an undesired manner thus preventing indentions into the hose material to be clamped.

In summary, the following is to be stated: The invention relates to a hose clip comprising a metallic housing 16, which has a bearing part 10 for a band-tightening screw 12 and a saddle 14, and an annularly curved flat metal band 18. The metal band 18 is, in the area of its one end 20, rigidly connected to the saddle 14 and can be guided with its other free end 22 through a band channel 24 of the housing 16. The metal band 18 has furthermore, in the area of its free end 22, a grid-like sequence of slots 26 with transversely inclined shoulders 28 for engagement by a short thread 30 of the band-tightening screw 12, which short thread 30 is arranged in the saddle area 14 of the housing 16. In order to enable automatic manufacturing with a high degree of reliability, the housing is designed as a one-piece bent part stamped from a metal blank, which is joined at joints 32, 34 in the area of the bearing part 10 and the saddle 14 by means of each one laser weld seam 36, 38. The one band end 20 is additionally welded with a further laser weld seam 40 either by butt-welding, or by overlapping welding to the saddle 14. The band-tightening screw 12 is with a head portion 64 supported axially and radially in the bearing part 10 and carries a short thread 30 at its end opposite the head portion 64. The short thread 30 can be completely axially moved from its area of engagement with the band slots 26 so that a rapid fitting is possible.

We claim:

1. A hose clip, comprising:

a band-tightening screw having a threaded portion;

a metallic housing having a bearing part for rotatably supporting said band-tightening screw, and a saddle which includes wall means having an interior surface defining a band channel in said housing, an exterior clamping surface adapted for contact with a hose being clamped, and first and second saddle edges disposed at opposite ends of said band channel, said band channel opening toward the threaded portion of said screw and having at least a first aperture proximate said first saddle edge, said housing being a bent stamped metal part which is joined at joints disposed in the area of at least one of said bearing part, said saddle and said second saddle edge thereof; and an annularly curved flat metal band having first and second band ends, a radially inward facing surface and a radially outward facing surface, said band having a grid-like sequence of slots with transversely oriented shoulders disposed proximate said first band end, said second band end butting against said second saddle edge and being rigidly connected thereto with said radially inward facing surface of said band being substantially flush with said exterior clamping surface of said saddle, said first band end being guided within said band channel through said first aperture and disposed with said slots operatively engaging said threaded portion to facilitate clamping of a hose upon rotation of said screw.

2. The hose clip according to claim 1, wherein a freely projecting tongue, which is curved in a longitudinal direction of the band, is arranged on said first saddle edge which is disposed opposite said bearing part.

3. The hose clip according to claim 1, wherein at least one of said saddle and said bearing part have adjacent bent plates arranged in oppositely oriented pairs with respect to one another which have the same shape and are bent toward one another with opposing edges forming a joint therebetween that is aligned in a longitudinal direction of said band, said plates being connected with one another in pairs at each said joint by laser weld seams.

4. The hose clip according to claim 3, wherein said adjacent bent plates of at least one of said saddle and of said bearing part are separated from one another by a transverse notch forming said first aperture of said band channel.

5. The hose clip according to claim 1, wherein said laser welding seams of said bearing part and of said saddle are step-like offset with respect to one another with a second aperture of the band channel being disposed therebetween opposite said first aperture.

6. The hose clip according to claim 1, wherein said saddle has a plate-like extension which is curved in the longitudinal direction of said band, on side of said saddle adjacent said bearing part.

7. The hose clip according to claim 1, wherein said laser weld seams are designed as line seams.

8. The hose clip according to claim 1, wherein said second band end is butt-welded to said second saddle edge by means of a laser weld seam therebetween proximate said bearing portion.

9. A hose clip, comprising:

a band-tightening screw having a threaded portion;

a metallic housing having a bearing part for rotatably supporting said band-tightening screw, and a saddle which includes wall means having an interior surface defining a band channel in said housing, an exterior surface adapted for contact with a hose being clamped, and first and second saddle edges disposed at opposite ends of said band channel, said band channel opening toward the threaded portion of said screw and having at least a first aperture proximate said first saddle edge, said housing being a bent stamped metal part which is joined at joints disposed in the area of at least one of said bearing part, said saddle and said second saddle edge thereof; and an annularly curved flat metal band having first and second band ends, a radially inward facing surface and a radially outward facing surface, said band having a grid-like sequence of slots with transversely oriented shoulders disposed proximate said first band end, said outward facing surface of said second band end being rigidly connected to said exterior surface of said saddle with said radially inward facing surface of said band defining a continuous, non-stepped clamping surface in the area of said saddle, said first band end being guided within said band channel through said first aperture and disposed with said slots operatively engaging said threaded portion to facilitate clamping of a hose upon rotation of said screw, said second band end having an overlapping laser weld seam between said inward facing surface of said band and said exterior surface of said saddle.

10. The hose clip according to claim 9, wherein said second band end is welded on said saddle and projects with a free part tongue-like beyond said saddle toward the side thereof which is opposite said bearing part.

11. The hose clip according to claim 9, wherein said overlapping laser weld seam is one of a spot weld seam and a system weld seam consisting of transverse and longitudinal spot seams.

12. A hose clip, comprising:

a band-tightening screw having a threaded portion;

a metallic housing having a bearing part for rotatably supporting said band-tightening screw, and a saddle which includes opposing, spaced apart side walls that terminate at side edges, said saddle having a surface facing in an interior direction toward said threaded portion of said screw and opening in an exterior direction proximate said side edges, said housing being a bent stamped metal part; and an annularly curved flat metal band having first and second ends, side edges, a radially inward facing surface and a radially outward facing surface, said band having a grid-like sequence of slots with transversely oriented shoulders proximate said first end, said side edges proximate said second end being secured to said mutually adjacent side edges of said saddle to enclose an outward opening side of said saddle and define a continuous, non-stepped clamping surface, said second end of said band and said side walls of said saddle defining a band channel in said housing having at least a first aperture, said first end being guided within said band channel through said first aperture and disposed with said slots operatively engaging said threaded portion to facilitate clamping of a hose upon rotation of said screw.

13. The hose clip according to claim 12, wherein two laser weld seams are respectively provided between mutually adjacent pairs of said side edges of said saddle and said side edges of said band.

* * * * *